United States Patent
Yeh et al.

(10) Patent No.: US 7,605,984 B2
(45) Date of Patent: Oct. 20, 2009

(54) LENS WITH ADJUSTABLE FOCAL LENGTH

(75) Inventors: Jer-Liang Andrew Yeh, Taichung (TW); Chih-Cheng Cheng, Banciao (TW); Chia-Ming Chang, Kaohsiung (TW)

(73) Assignee: National Tsing Hua University, Hsinchu (TW)

( * ) Notice: Subject to any disclaimer, the term of this patent is extended or adjusted under 35 U.S.C. 154(b) by 262 days.

(21) Appl. No.: 11/523,621

(22) Filed: Sep. 20, 2006

(65) Prior Publication Data

US 2007/0070509 A1    Mar. 29, 2007

(30) Foreign Application Priority Data

Sep. 21, 2005  (TW) .............................. 94132592 A
Jun. 26, 2006  (CN) ........................ 2006 1 0090839

(51) Int. Cl.
    *G02B 1/06*  (2006.01)
(52) U.S. Cl. ..................................... 359/666
(58) Field of Classification Search ......... 359/665–667, 359/332
    See application file for complete search history.

(56) References Cited

U.S. PATENT DOCUMENTS 5,808,593 A *  9/1998  Sheridon ..................... 345/84

| 2003/0006140 | A1  | 1/2003  | Vacca et al. |
| 2003/0183525 | A1  | 10/2003 | Elrod et al. |
| 2006/0042950 | A1* | 3/2006  | Sarrut ........................ 204/600 |
| 2008/0124252 | A1* | 5/2008  | Marchand et al. ........... 422/129 |
| 2008/0310031 | A1* | 12/2008 | Mohr et al. ................. 359/666 |

FOREIGN PATENT DOCUMENTS

WO    WO-2006/084653    *  8/2006

OTHER PUBLICATIONS

Cheng at al., Variable focus dielectric liquid droplet lens Express, vol. 14, No. 9, May 1, 2006.

* cited by examiner

*Primary Examiner*—Jordan M. Schwartz
(74) *Attorney, Agent, or Firm*—Birch, Stewart, Kolasch & Birch, LLP

(57) ABSTRACT

A lens device with an adjustable focal length is provided. The lens device includes a non-conductive liquid droplet, which is surrounded by air or immiscible liquids. The non-conductive liquid droplet is placed on a bottom plate. The bottom plate includes a set of first electrodes. The set of first electrodes is disposed in such a way that the set of first electrodes are capable of being selectively biased to respectively create a first voltage potential difference between the liquid droplet and each of the set of first electrodes. With the first voltage potential differences, a dielectric force is induced, and the profile of the non-conductive liquid droplet is adjustable. Thus, the focal length of the lens is adjustable.

5 Claims, 4 Drawing Sheets

LENS WITH ADJUSTABLE FOCAL LENGTH

BACKGROUND OF THE INVENTION

1. Field of the Invention

This invention is related to a lens used in an optical system and, more particularly, to a lens with an adjustable focal length.

2. Description of the Prior Art

Generally, focal length tuning lenses in optical systems can be categorized into two types: mechanical tuning lenses and electrical tuning lenses. In mechanical tuning lenses, the tuning function is achieved by a motor which moves lenses forward or backward; thus, a large volume and high power consumption are required for movable lenses.

In prior arts, an electrical tuning lens adjusts its focal length by deforming the profile of a liquid with electrowetting mechanisms. The liquids in an electrical tuning lens generally include a conductive liquid and an insulating liquid. The profile of the conductive liquid can be electrically changed by electrowetting mechanisms, so that a variable focal length of the lens is obtained.

The patent, U.S. Pat. No. 6,545,815, discloses an adjustable liquid lens with the assistance of electrowetting mechanisms. FIG. 1 illustrates a liquid lens 10 proposed in this prior art. In this patent, a conductive liquid droplet 11 is disposed on an insulating layer 12 that also functions as a lubricating layer. A control electrode 15 is located under the insulating layer 12. A droplet electrode 16 directly contacts with the conductive liquid droplet 11. The voltage difference between the control electrode 15 and the droplet electrode 16 induces electrowetting effect to deform the profile of the conductive liquid droplet 11. The focal length of the liquid lens 10 is adjusted while the profile of the conductive liquid droplet 11 is electrically deformed.

Lenses utilizing electrowetting mechanisms in prior arts have disadvantages due to the fact that the conductive liquid is made of electrolyte. For instance, the conductive liquid droplet 11 contacts directly with the droplet electrode 16 that induces high electric currents. Electrolysis occurs in the conductive liquid droplet 11 due to the electric currents. In addition, the conductive liquid droplet 11 is heated due to the electric fields provided by the voltage difference. This effect is named as Joule heating.

SUMMARY OF THE INVENTION

To solve the aforementioned problems, this invention provides a lens with an adjustable focal length using dielectric forces instead of electrowetting mechanisms. Dielectric forces are generated under external electric fields due to the difference of the dielectric constants between two non-conductive media (e.g. liquid, gas, and solid). Distinct to the conductive liquid used in the electrowetting method, the liquids used in the dielectric force method are non-conductive.

One preferred embodiment, according to this invention, is a lens including a non-conductive liquid droplet. The non-conductive liquid droplet is placed on a bottom plate that includes a set of first electrodes. The set of first electrodes is disposed in such a way that the set of first electrodes are capable of being selectively biased to respectively create a first voltage potential difference between the liquid droplet and each of the set of first electrodes. The dielectric constants of the liquid droplet and the medium surrounding the droplet (e.g. air or other liquids) are different. Dielectric forces are induced by the difference of the dielectric constants while the first voltage potential differences are applied. The profile of the non-conductive liquid droplet is deformed by the dielectric forces and thereby causes a change of the focal length of the lens.

The other preferred embodiment, according to this invention, is a lens including a chamber and a set of electrodes. The chamber is filled with a first liquid and a droplet of a second liquid. The first liquid and the second liquid are immiscible to each other. Both of the liquids are non-conductive, and their dielectric constants are different. The interface between the first liquid and the droplet of the second liquid (i.e. surface profile of the liquid droplet) is deformable by electric fields provided by the set of electrodes. The focal length of the lens is accordingly adjustable by deforming the interface.

The advantage and spirit of the invention may be understood by the following recitations together with the appended drawings.

BRIEF DESCRIPTION OF THE APPENDED DRAWINGS

Figure 5A:
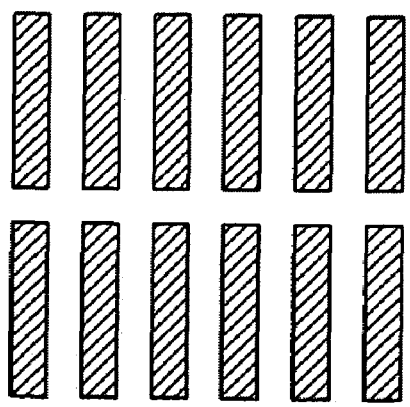
Figure 5B:
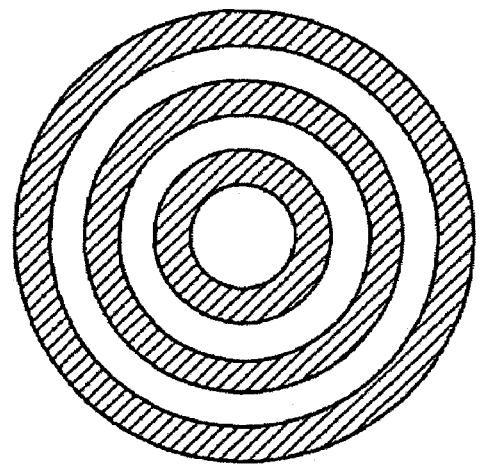
Figure 5C:
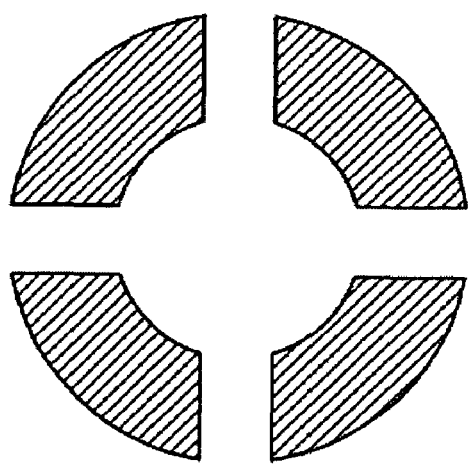

FIGS. 5(A), 5(B) and 5(C) show several possible disposition forms of electrodes.

DETAILED DESCRIPTION OF THE INVENTION

One main purpose of this invention is to provide a lens with an adjustable focal length.

Each medium (e.g. liquid) has specific dielectric properties, particularly a specific dielectric constant. One dielectric constant consists of a real part and an imaginary part. The real part and the imaginary part represent polarizability and the conductivity of the liquid, respectively. The polarizability indicates how well molecules in the medium are polarized under electric fields. In a case of two immiscible liquids with different real parts of the dielectric constants, the dielectric forces are induced on the interface of the two liquids while electric fields pass through the interface. The dielectric forces result from the gradient of the electric energy $\in\in_0 E^2$ where $\in$ is the real part of the dielectric constant, and E is the electric field strength on the interface of the two liquids. Hence, the difference of the real part of dielectric constants between the two liquids induces the dielectric forces. Non-conductive liquid in this invention can be theoretically defined as $\sigma/(\omega\in\in_0) < 1$, where $\sigma$ is conductivity, $\omega$ is angular frequency, and $\in_0$ is permittivity of free space (vacuum).

In this invention, dielectric forces are utilized to control the shape of a liquid droplet; thus, the focal length of a lens is adjustable. According to this invention, the liquid droplet can be liquid crystal, ether ketone, alcohol, or any organic material capable of being polarized by an electric field. The liquid droplet does not have to be conductive. Besides, electrodes for generating electric fields are not required to directly contact with the liquids in this invention. Many disadvantages in prior arts are avoided accordingly.

Figure 1:
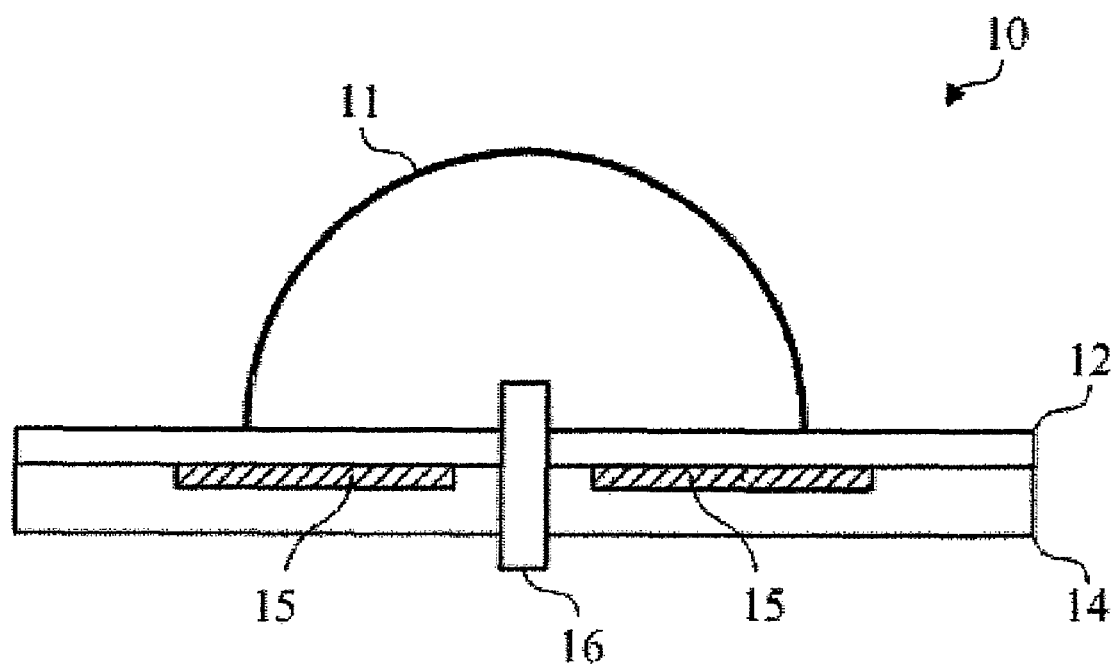
FIG. 1 illustrates a liquid lens adjusted by electrowetting effects.
Figure 2A:
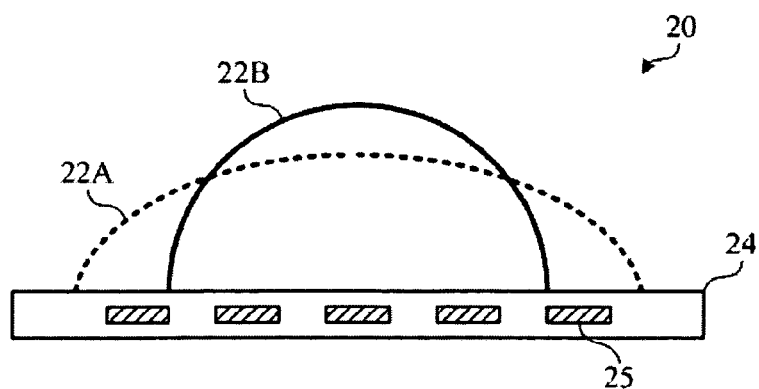
FIG. 2(A) illustrates a lens in the first preferred embodiment according to this invention.

Referring to FIG. 2(A), it illustrates a lens in the first preferred embodiment according to this invention. The lens 20 includes a non-conductive liquid droplet (22A and 22B) and a bottom plate 24. The curves 22A and 22B represents the profile of the droplet without and with the influence of electric fields, respectively. The bottom plate 24 includes a set of first electrodes 25. The bottom plate 24 is used to place the liquid droplet. The set of first electrodes 25 is disposed in such a way that the set of first electrodes 25 can be selectively biased to respectively create a first voltage potential difference between the liquid droplet and each of the set of first electrodes. The profile of the non-conductive liquid droplet is deformed by dielectric forces and accordingly causes a change in the focal length of the lens. That is to say, the focal length of the lens can be adjusted through controlling the distribution of the electric fields.

Figure 2B:
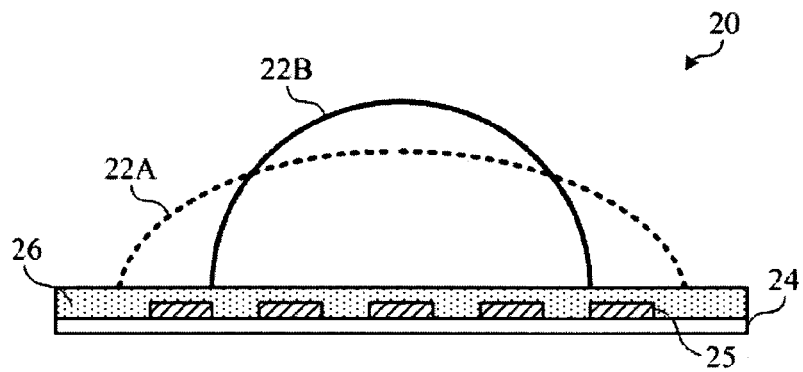
FIG. 2(B) shows how the first preferred embodiment further includes a lubricating layer.

To improve the tuning effect of the focal length by dielectric forces, the bottom plate 24 can be further coated with a lubricating layer 26 as shown in FIG. 2(B). The lubricating layer 26 is disposed between the liquid droplet and the set of first electrodes 25. The lubricating layer 26 can be Teflon, polydimethyl siloxane (PDMS), thick film photo-resist, parylene, silicon oxide, or any hydrophobic material. The lubricating layer 26 is used to reduce the friction between the droplet and the bottom plate 24.

Figure 2C:
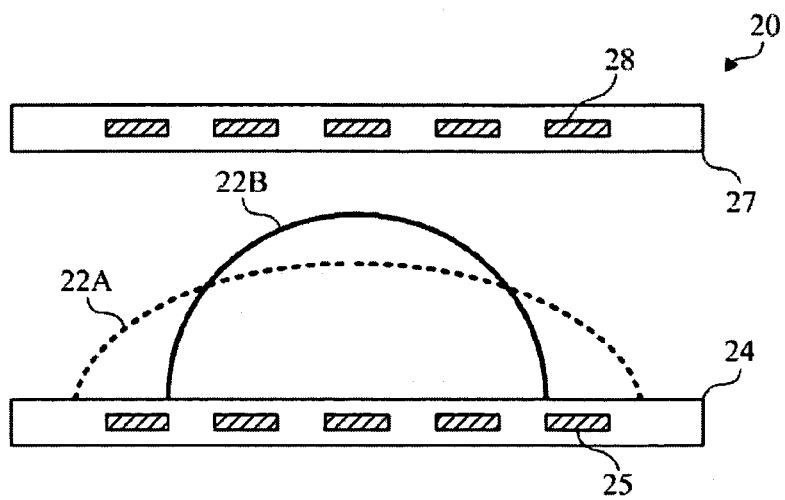
FIG. 2(C) shows how the first preferred embodiment further includes an upper plate.

FIG. 2(C) illustrates another modification of the lens shown in FIG. 2(A). In addition, the lens 20 includes an upper plate 27. The upper plate 27 includes a set of second electrodes 28 disposed in such a way that the set of second electrodes 28 may be selectively biased to respectively create a second voltage potential difference between the liquid droplet and each of the set of second electrodes 28. The profile of the liquid droplet is deformed by dielectric forces and accordingly causes a change in the focal length of the lens. Dielectric forces are induced by the difference of the real parts of the dielectric constants while electric fields are applied. The strength of the electric fields is controlled by the difference of voltage potentials between the set of second electrodes 28 and the set of first electrodes 25. The profile of the non-conductive liquid droplet is adjusted electrically by the applied voltages.

Figure 3:
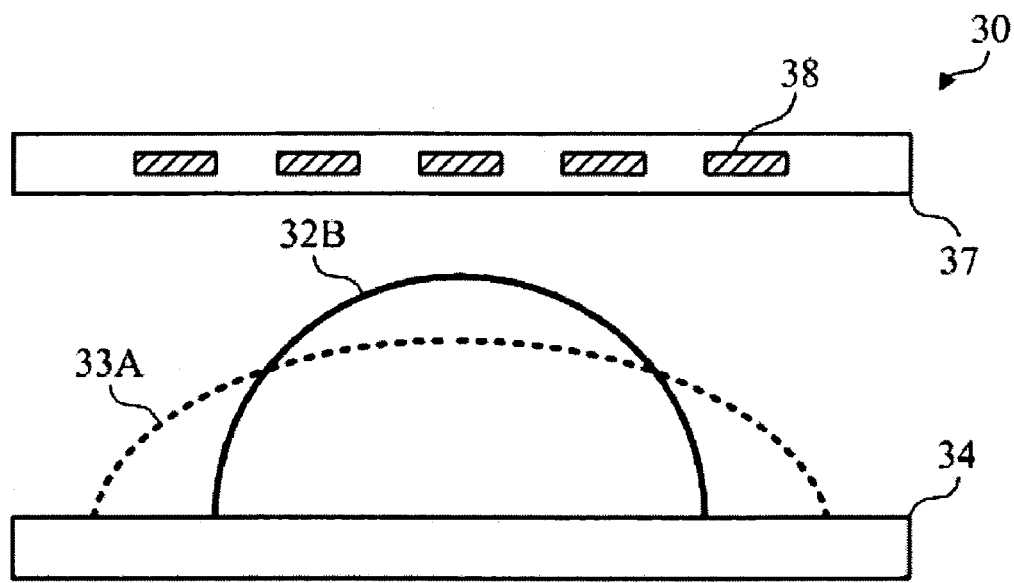
FIG. 3 illustrates a lens in the second preferred embodiment according to this invention.

Referring to FIG. 3, it illustrates a lens in the second preferred embodiment according to this invention. The lens 30 includes a droplet (32A and 32B), a bottom plate 34, and an upper plate 37. The curves 32A and 32B represents the profile of the droplet without and with the influence of electric fields, respectively. The main difference between the second and first embodiments is that the bottom plate 34 is only used for placing the liquid droplet. In this embodiment, the electric fields are provided by the electrodes 38 at the upper plate 37.

Figure 4:
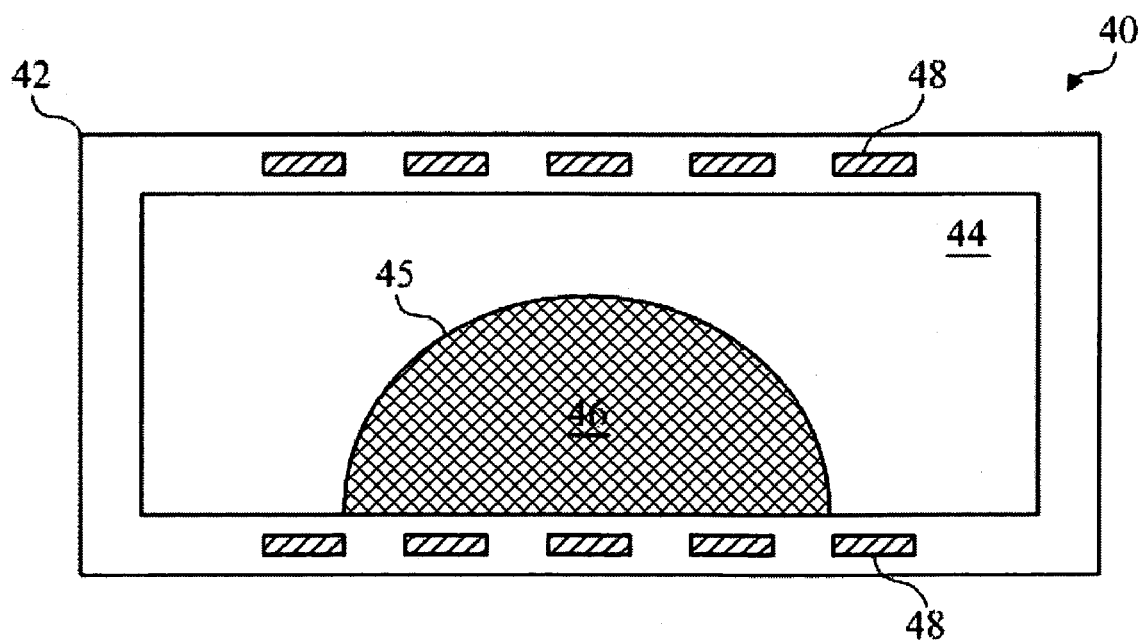
FIG. 4 illustrates a lens in the third preferred embodiment according to this invention.

Referring to FIG. 4, it illustrates a lens 40 in the third preferred embodiment according to this invention. The lens 40 includes a chamber 42, a first liquid 44, and a droplet of a second liquid 46. The first liquid 44 and the droplet of the second liquid 46 are both disposed in the chamber 42.

The first liquid 44 and the droplet of the second liquid 46 are non-conductive liquids. The first liquid 44 has a first dielectric constant; the droplet of the second liquid 46 has a second dielectric constant. The first and the second dielectric constants are unequal. In this embodiment, the first liquid 44 and the second liquid 46 are immiscible to each other. Hence, an interface 45 between the first liquid 44 and the droplet of the second liquid 46 is formed.

The lens 40 includes a set of third electrodes 48. The set of third electrodes 48 is disposed in such a way that the set of third electrodes 48 may be selectively biased to generate electric fields passing through the interface 45. By changing the electric fields, the interface 45 can be deformed by dielectric forces. In this way, the profile of the interface 45 can be adjusted and the focal length of the lens is accordingly adjustable.

Referring to FIG. 5, it shows several possibilities of disposition forms of the electrodes. In actual applications, the first electrodes 25, the second electrodes 28, and the third electrodes 48 can be disposed in the form of a matrix as shown in FIG. 5(A), a concentric circle as shown in FIG. 5(B), or a circle as shown in FIG. 5(C). The third electrodes 48 can also be disposed in parallel, as shown in FIG. 4. As long as the effect of controlling the profile of the liquid droplet can be achieved, other disposition forms of the electrodes can be applied in the embodiments of this invention.

The lenses with adjustable focal lengths according to this invention provide an effective tuning method. Because the electrodes in this invention do not directly contact the liquid droplet, the electric current in this invention is potentially lower than that of prior arts. Furthermore, this invention avoids the problems of Joule heating and electrolysis in prior arts.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A lens device comprising:
   a chamber filled with a first liquid and a droplet of a second liquid, the first liquid and the second liquid being immiscible to each other, the first liquid and the second liquid being non-conductive and having different dielectric constants; and
   a set of electrodes for generating an electric field, the curvature of an interface between the first liquid and the droplet of the second liquid being controlled by a dielectric force induced by the different dielectric constants under the electric field such that a focal length of the lens device is adjustable.

2. The lens device of claim 1, said lens device further comprising:
   a lubricating layer disposed between the first liquid, the droplet of the second liquid, and the set of electrodes.

3. The lens device of claim 2, wherein the lubricating layer comprises at least one of the following: Teflon, polydimethyl siloxane (PDMS), thick film photo-resist, parylene, silicon oxide, or an insulating material.

4. The lens device of claim 1, wherein the first liquid comprises at least one of the following: liquid crystal, ether, ketone, alcohol, and an organic material capable of being polarized by an electric field.

5. The lens device of claim 1, wherein the set of electrodes are disposed in the form of a circle, a matrix, or a concentric circle.

* * * * *